US011497221B2

(12) United States Patent
Aggarwal et al.

(10) Patent No.: US 11,497,221 B2
(45) Date of Patent: Nov. 15, 2022

(54) SYSTEMS AND METHODS FOR MANAGING MEAT CUT QUALITY

(71) Applicant: Walmart Apollo, LLC, Bentonville, AR (US)

(72) Inventors: Parul Aggarwal, Bengaluru (IN); Mangesh N. Kulkarni Wadhonkar, Hyderabad (IN); Amit Jhunjhunwala, Bangalore (IN); Rahul Kumar, Bangalore (IN); Raghav Mehta, Bengaluru (IN); Peeyush Taneja, Delhi (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/916,682

(22) Filed: Jun. 30, 2020

(65) Prior Publication Data

US 2021/0015113 A1    Jan. 21, 2021

Related U.S. Application Data

(60) Provisional application No. 62/899,955, filed on Sep. 13, 2019.

(30) Foreign Application Priority Data

Jul. 19, 2019  (IN) .............................. 201941029121

(51) Int. Cl.
*A22C 17/00* (2006.01)
*G06T 7/00* (2017.01)
(Continued)

(52) U.S. Cl.
CPC .......... *A22C 17/008* (2013.01); *G06K 9/6253* (2013.01); *G06K 9/6256* (2013.01);
(Continued)

(58) Field of Classification Search
CPC ............. A22C 17/008; G06K 2209/17; G06K 9/6253; G06K 9/6256; G06K 9/6267;
(Continued)

(56) References Cited

U.S. PATENT DOCUMENTS 5,944,598 A    8/1999   Tong
9,476,865 B2   10/2016  Subbiah
(Continued)

FOREIGN PATENT DOCUMENTS

CA    2420381    2/2002
CN    1603801    4/2005
(Continued)

OTHER PUBLICATIONS

AMPC; "Intelligent solutions for boxed beef trim export enhancement"; Australian Meat Processor Corporation; ampc.com.au; Nov. 7, 2018; pp. 1-44.
(Continued)

*Primary Examiner* — Dakshesh D Parikh
(74) *Attorney, Agent, or Firm* — Fitch, Even, Tabin & Flannery LLP

(57) ABSTRACT

In some embodiments, apparatuses and methods are provided herein useful to ensuring quality of meat cuts. In some embodiments, a system for ensuring quality of meat cuts comprises a capture device comprising an image capture device configured to capture an image of a cut of meat, a depth sensor configured to capture depth data, a transceiver configured to transmit the image and the depth data, a microcontroller configured to control the image capture device, the depth sensor, and the transceiver, a database configured to store meat cut specifications, and the control circuit configured to receive, from the capture device, the image and the depth data, retrieve, from the database, a meat cut specification, evaluate the image of the cut of meat and
(Continued)

the depth data associated with the cut of meat, and classify the cut of meat.

14 Claims, 3 Drawing Sheets

(51) Int. Cl.
*G06K 9/62* (2022.01)
*G06T 7/50* (2017.01)
*G06V 20/68* (2022.01)

(52) U.S. Cl.
CPC ............ *G06K 9/6267* (2013.01); *G06T 7/001* (2013.01); *G06T 7/50* (2017.01); *G06T 2207/10028* (2013.01); *G06T 2207/20081* (2013.01); *G06T 2207/20084* (2013.01); *G06T 2207/30128* (2013.01); *G06V 20/68* (2022.01)

(58) Field of Classification Search
CPC .. G06K 9/00201; G06K 9/627; G06K 9/6289; G06T 2207/10028; G06T 2207/20081; G06T 2207/20084; G06T 2207/30128; G06T 7/001; G06T 7/50
USPC ........................................................ 382/110
See application file for complete search history.

(56) References Cited

U.S. PATENT DOCUMENTS

| | | | |
|---|---|---|---|
| 2004/0028777 A1 | 2/2004 | Koke | |
| 2007/0178819 A1* | 8/2007 | McKenna | A22C 17/0086 452/157 |
| 2009/0216459 A1 | 8/2009 | Goldberg | |
| 2014/0185911 A1* | 7/2014 | Steffenson | G06T 7/75 382/141 |
| 2019/0073568 A1* | 3/2019 | He | G06T 7/0006 |
| 2019/0108396 A1* | 4/2019 | Dal Mutto | G06K 9/6267 |
| 2019/0294923 A1* | 9/2019 | Riley | G06K 9/6256 |
| 2020/0257889 A1* | 8/2020 | Merkel | G06V 10/443 |
| 2021/0004589 A1* | 1/2021 | Turkelson | G06K 9/6273 |
| 2021/0204553 A1* | 7/2021 | Mehta | A22C 17/008 |
| 2021/0272303 A1* | 9/2021 | Miao | G06T 7/0002 |

FOREIGN PATENT DOCUMENTS

| | | |
|---|---|---|
| CN | 101561402 | 10/2009 |
| CN | 201508328 U | 6/2010 |
| CN | 102156129 A | 8/2011 |
| CN | 102519962 | 6/2012 |
| CN | 102608118 | 7/2012 |
| CN | 103149163 | 6/2013 |
| CN | 103940751 A | 7/2014 |
| CN | 105651776 | 6/2016 |
| DE | 102008044764 | 7/2009 |
| EP | 1317379 | 6/2003 |
| GB | 2285126 A | 6/1995 |
| KR | 20110012103 | 2/2011 |
| WO | 9400997 | 1/1994 |
| WO | 2002016210 | 2/2002 |
| WO | 03034059 | 4/2003 |
| WO | 2005034639 | 4/2005 |
| WO | 2008010732 A1 | 1/2008 |
| WO | 2009087258 | 7/2009 |

OTHER PUBLICATIONS

Larsen, Anders Boesen Lindbo, et al.; "Vision-based method for tracking meat cuts in slaughterhouses"; Meat science; 96(1); 2014; pp. 366-372.
Visor Ltd.; "Food Industry"; https://www.visor.hr/2016-03-26-08-54-10/food-industry; available at least as early as Jan. 24, 2019; 4 pages.
ScienceSoft; "Computer vision takes the food industry to the next level"; https://www.scnsoft.com/blog/computer-vision-takes-the-food-industry-to-the-next-level; available at least as early as Jan. 24, 2019; 4 pages.
Hermary Opto Electronics Inc.; "Automated Smart Saw Butchering"; https://www.hermary.com/applications/meat-industry/automated-smart-saw-butchering/; available at least as early as Jan. 24, 2019; 4 pages.
Integro Technologies; "Machine Vision with the Super Power of Deep Learning"; http://www.integro-tech.com/machinevision-with-the-super-power-of-deep-learning/; available at least as early as Jan. 24, 2019; 9 pages.

* cited by examiner

SYSTEMS AND METHODS FOR MANAGING MEAT CUT QUALITY

CROSS-REFERENCE TO RELATED APPLICATION

This application claims the benefit of Indian Provisional Application No. 201941029121, filed Jul. 19, 2019, and U.S. Provisional Application No. 62/899,955, filed Sep. 13, 2019, which are incorporated by reference in their entirety herein.

TECHNICAL FIELD

This invention relates generally to quality control devices and, more particularly, automated classification devices.

BACKGROUND

In many retail environments, customers purchase smaller cuts of meat, such as steaks or subdivisions, of a primal cut. A butcher receives the primal cut and divides the primal cut into the smaller cuts. Because this is typically done by hand, there exists the opportunity for variation from cut-to-cut. To ensure the quality of cuts, many retail facilities periodically examine a portion of the cuts. This examination is performed by human observation. Because this evaluation is performed by human observation, it is impractical, if not impossible, to examine every cut of meat. It is easy to see how this can be problematic. Additionally, the quality of the cut of meat can vary from person-to-person, as more than one person may divide primal cuts for the retail facility. Consequently, a need exists for automated systems to evaluate the quality of cuts of meat.

BRIEF DESCRIPTION OF THE DRAWINGS

Disclosed herein are embodiments of systems, apparatuses and methods pertaining ensuring quality for meat cuts. This description includes drawings, wherein.

Figure 1:
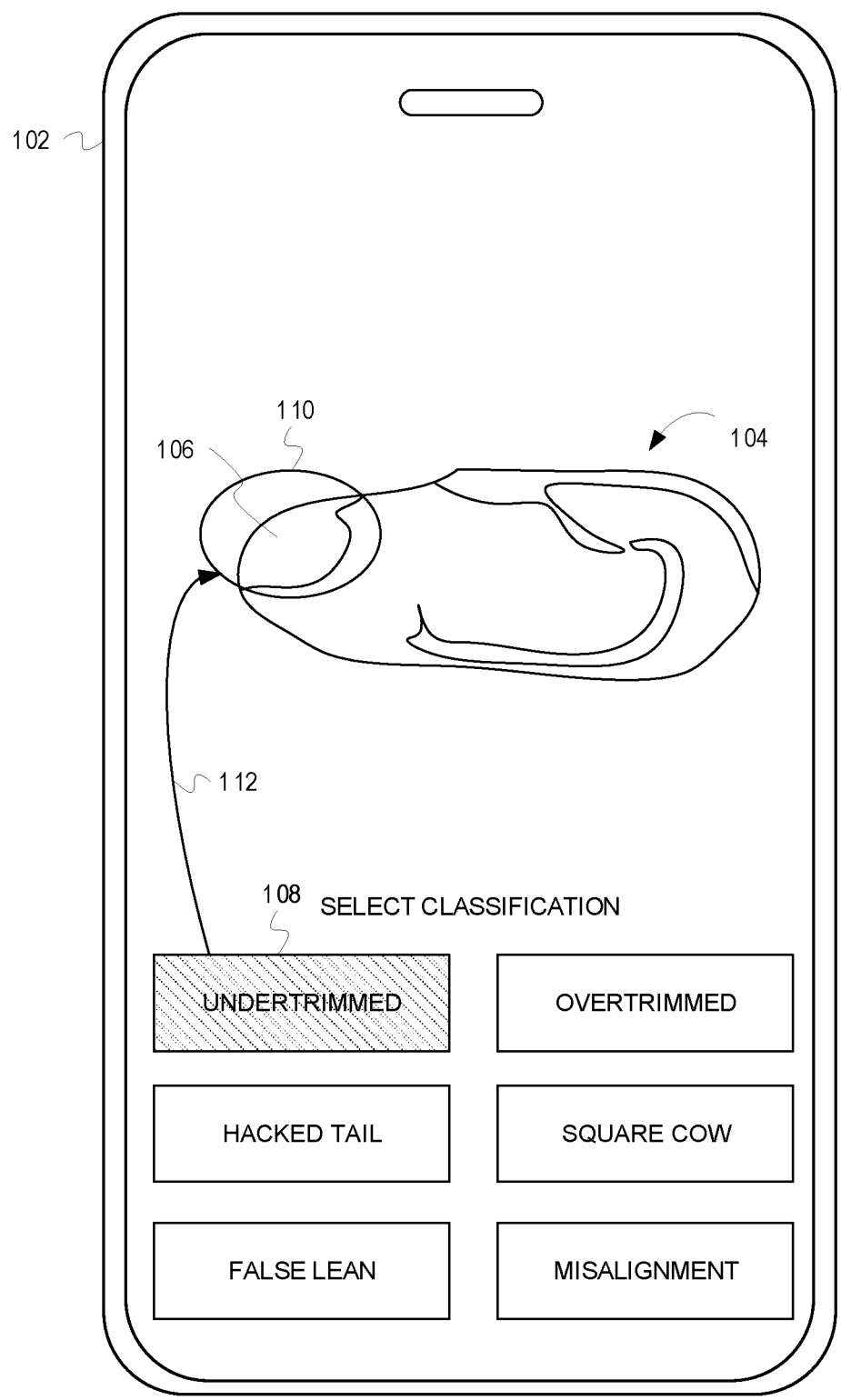
FIG. 1 depicts a mobile device 102 presenting meat cut quality information, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to ensuring quality of meat cuts. In some embodiments, a system for ensuring quality of meat cuts comprises a capture device, the capture device comprising an image capture device, wherein the image capture device is configured to capture an image of a cut of meat, a depth sensor, wherein the depth sensor is configured to capture depth data associated with the cut of meat, a transceiver, wherein the transceiver is configured to transmit the image of the cut of meat and the depth data associated with the cut of meat to a control circuit, a microcontroller, wherein the microcontroller is configured to control the image capture device, the depth sensor, and the transceiver, a database, wherein the database is configured to store meat cut specifications, and the control circuit, wherein the control circuit is communicatively coupled to the capture device and the database, and wherein the control circuit is configured to receive, from the capture device, the image of the cut of meat and the depth data associated with the cut of meat, retrieve, from the database, a meat cut specification associated with the cut of meat, evaluate, based on the meat cut specification associated with the cut of meat, the image of the cut of meat and the depth data associated with the cut of meat, and classify, based on the evaluation of the cut of meat, the cut of meat.

As previously discussed, because most primal cuts are divided into smaller cuts by hand, significant variation from cut-to-cut is possible. Additionally, not only does variation occur for each person, but can meat cut quality can vary from person-to-person if a retail facility has multiple butchers. Quality and consistency of cuts is important to customers. For example, a retail facility may have a reputation for consistently providing high quality cuts of meat and may earn customer loyalty, as well as new customers, based on this reputation. Ensuring that these high standards are upheld is typically performed manually. That is, a person will inspect cuts produced by the butchers. Unfortunately, it is impractical, if not impossible, to inspect every cut of meat. The inability to do so may result in inconsistencies in meat cut quality which cause customer dissatisfaction. Described herein are systems, methods, and apparatuses that automate this process.

In some embodiments, a system for ensuring the quality of meat cuts includes a capture device that is capable of capturing data associated with a cut of meat. Specifically, the capture device captures images of the cut of meat and depth data for (e.g., depth measurements of) the cut of meat. This data is compared with meat cut specifications to classify the cut of meat. For example, the cut of meat may be too thin, to thick, overtrimmed or undertrimmed, misaligned in the packaging, etc. The classifications are used to ensure the quality of cuts of meat. The discussion of FIG. 1 provides an overview of classifying cuts of meat.

FIG. 1 depicts a mobile device 102 presenting meat cut quality information, according to some embodiments. The mobile device 102 includes a display device and a user input device. Though the display device and user input device can be of any suitable type, in some embodiments, as depicted in FIG. 1, the display device and the user input device are incorporated into a single touchscreen. The mobile device 102 presents an image 104 of a cut of meat. Additionally, the mobile device 102 presents classifications for the cut of meat. The classifications are related to the quality of the cut of meat. That is, the classifications are associated with how the meat was cut, as opposed to the quality of the meat (e.g., on the USDA grading scale). The classifications can include, for example, thickness, trimming, shape, alignment, etc., and can be adapted based on the type of meat and/or the cut of meat.

As depicted in FIG. 1, a user is classifying the cut of meat based on the image 104 of the cut of meat. The user is classifying the cut of meat by providing markings 110 on the image 104 of the cut of meat. As depicted in FIG. 1, the user has included the marking 110 indicating that a section 106 of the cut of meat is undertrimmed. The user has provided this marking 110 and selected an undertrimmed selection 108. This association is depicted by an arrow 112 in FIG. 1. The user input classifying the meat can be used in a training phase. During the training phase, the user manually classifies meat via the mobile device 102. The image 104 of the cut of meat is used by the system to learn how to classify cuts of meat. For example, the system analyzes images of the cuts of meats including markings using a neural network model. Using machine learning, the system can evaluate and classify cuts of meat in an autonomous manner. The training phase can include any suitable number of images (e.g., 100, 200, 500, etc.).

In some embodiments, the mobile device 102 can present meat cut quality information after the training phase is complete. For example, the mobile device 102 can present meat cut quality information as classified in an autonomous manner. The presentation of the meat cut quality information can include an image (e.g., the image 104 of the cut of meat), markings created by the system, as well as indications of any quality issues or variations. In such embodiments, a user can verify the system's accuracy and/or consistency.

Figure 2:
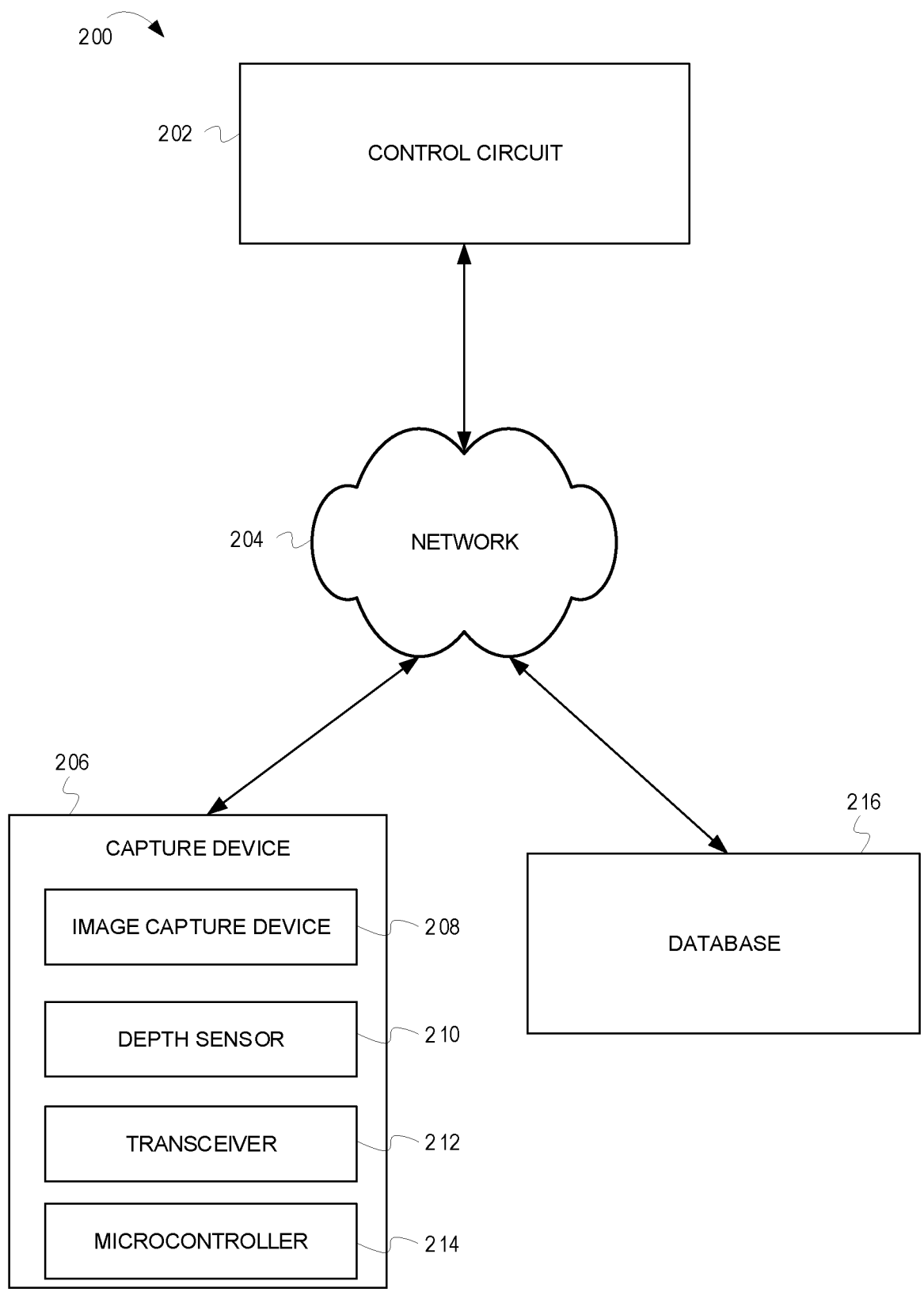
FIG. 2 is a block diagram of a system 200 for ensuring quality of meat cuts, according to some embodiments.

While the discussion of FIG. 1 provides detail regarding the presentation of meat cut quality information via a mobile device, the discussion of FIG. 2 provides additional detail regarding a system for automated classification of cuts of meat.

FIG. 2 is a block diagram of a system 200 for ensuring quality of meat cuts, according to some embodiments. The system 200 includes a control circuit 202, a capture device 206, and a database 216. At least some of the control circuit 202, capture device 206, and database 216 are communicatively coupled via a network 204. Accordingly, the network 204 can be of any suitable type (e.g., a local area network (LAN) and/or wide area network (WAN), such as the Internet) and include wired and/or wireless links.

The capture device 206 generally captures data regarding cuts of meat. The capture device 206 can be located in a retail facility (e.g., a grocery store), a distribution center, a meat processing center, etc. The capture device 206 includes an image capture device 208, a depth sensors 210, a transceiver 212, and a microcontroller 214. Though depicted as a single entity (i.e., the capture device 206), the image capture device 208, depth sensor 210, transceiver 212, and microcontroller 214 can comprise multiple hardware components that are communicatively coupled. For example, the image capture device 208 and the depth sensor 210 can be incorporated (i.e., resident on or incorporated with) into a single hardware component (e.g., a depth camera), and the transceiver 212 and the microcontroller 214 can be separate hardware components, or any other combination. Regardless of the configuration, the image capture device 208 captures an image of a cut of meat. Accordingly, the image capture device 208 can be any suitable type. The depth sensor 210 captures depth data associated with the cut of meat. The depth data can be, for example, the thickness of the cut of meat. The transceiver 212 transmits the image of the cut of meat and the depth data associated with the cut of meat to the control circuit 202. The microcontroller 214 controls the image capture device 208, the depth sensor 210, and the transceiver 212.

The database 216 is configured to store meat cut specifications. The database can store meat cut specifications for a variety of cuts of meat and for a variety of types of meat (e.g., beef, pork, poultry, fish, etc.). In some embodiments, the meat cut specifications are specific to types of cuts of meat. For example, the database 216 can store meat cut specifications for ribeye, filet, flank, skirt, etc. The meat cut specifications can be based on user input during the training phase (i.e., prepopulated) and/or classifications based on the machine learning.

The control circuit 202 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 202 is configured (for example, by using corresponding programming as will be well understood by those skilled in the art) to carry out one or more of the steps, actions, and/or functions described herein.

By one optional approach the control circuit 202 operably couples to a memory. The memory may be integral to the control circuit 202 or can be physically discrete (in whole or in part) from the control circuit 202 as desired. This memory can also be local with respect to the control circuit 202 (where, for example, both share a common circuit board, chassis, power supply, and/or housing) or can be partially or wholly remote with respect to the control circuit 202 (where, for example, the memory is physically located in another facility, metropolitan area, or even country as compared to the control circuit 202).

This memory can serve, for example, to non-transitorily store the computer instructions that, when executed by the control circuit 202, cause the control circuit 202 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The control circuit 202 receives the image of the cut of meat and the depth data associated with the cut of meat from the capture device 206 (e.g., via the transceiver 212). The control circuit evaluates the cut of meat based on the image of the cut of meat and the depth data associated with the cut of meat. This evaluation is performed based on a meat cut specification associated with the cut of meat. For example, if the cut of meat is a ribeye, the control circuit 202 evaluates the image of the cut of meat and the depth data associated with the cut of meat against a meat cut specification for a ribeye. The control circuit 202 retrieves the meat cut specification from the database 216. The control circuit 202 can evaluate the cut of meat based on any desired parameters, such a thickness, trimming, shape, alignment, etc. For example, the control circuit 202, based on the meat cut specification, can determine that the cut of meat is too thick or thin, has an undesirable or improper fat content, improperly trimmed (e.g., overtrimmed or undertrimmed), improperly shaped (e.g., square cow, hacked tail, etc.), misaligned (e.g., improperly positioned within the packaging), etc. The control circuit 202 classifies the cut of meat based on this evaluation. For example, if the evaluation determines that the cut of meat is too thick and undertrimmed, the control circuit 202 classifies the cut of meat as being too thick and undertrimmed.

In embodiments that include a training phase, the control circuit 202 can generate the meat cut specifications. That is, the control circuit 202 can receive images of cuts of meats that include markings. The markings indicate proper and/or improper cutting of the meat. The control circuit 202 analyzes the images including the markings using machine learning to generate the meat cut specifications. For example, the control circuit 202 can generate the meat cut specifications used in a neural network model. In such embodiments, the neural network model is trained based on the images including the markings.

Figure 3:
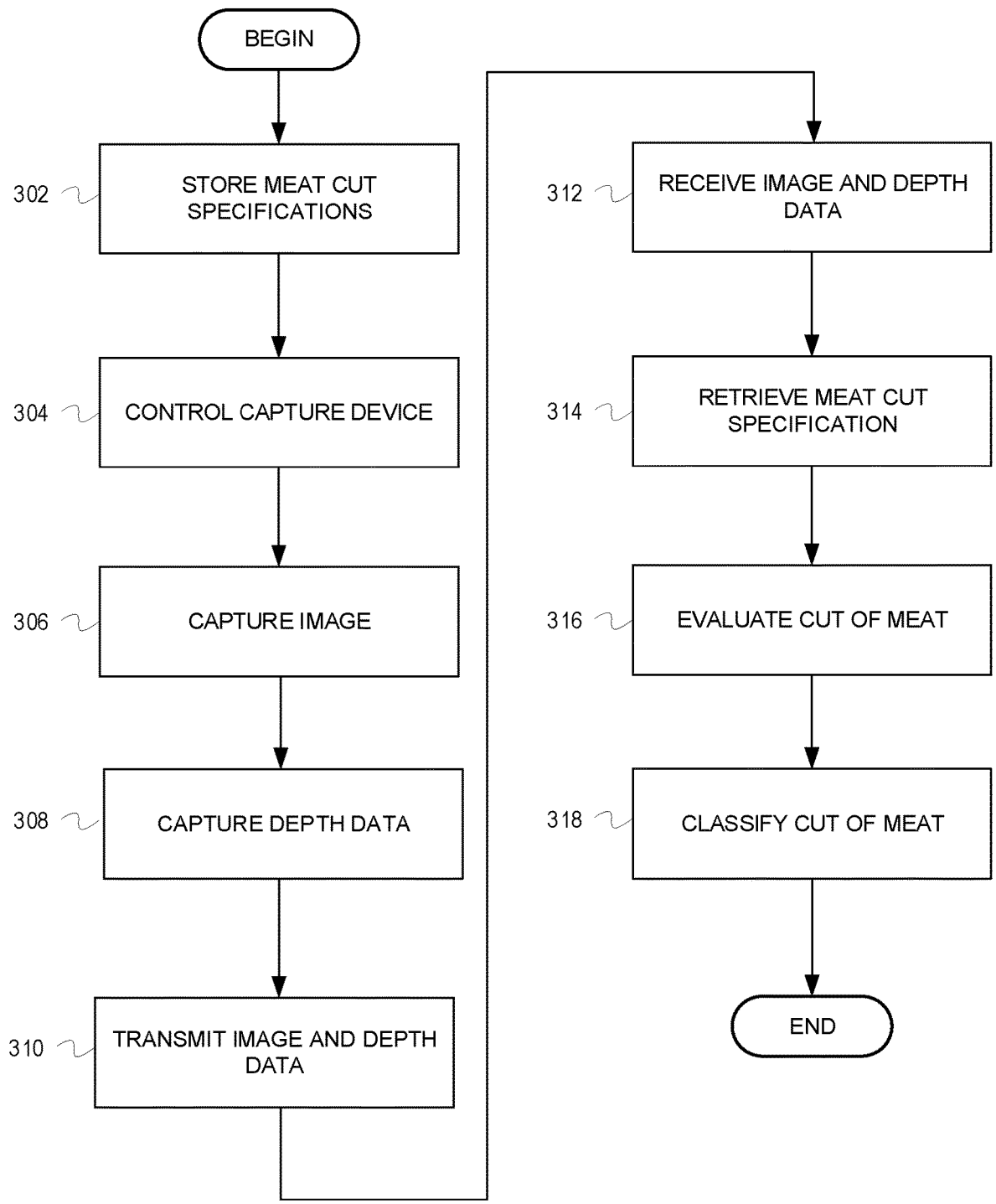
FIG. 3 is a flow diagram depicting example operations for ensuring quality of meat cuts, according to some embodiments.

While the discussion of FIG. 2 provides additional information regarding an automated system for classification of meat cuts, the discussion of FIG. 3 describes example operations of such a system.

FIG. 3 is a flow diagram depicting example operations for ensuring quality of meat cuts, according to some embodiments. The flow begins at block 302.

At block 302, meat cut specifications are stored. For example, a database can store the meat cut specifications. The meat cut specifications can be specific to a type of meat and/or a cut of meat. For example, the meat cut specifications may be for all cuts of fish, New York Strip cuts of steak, a subset of all poultry cuts, etc. The flow continues at block 304.

At block 304, a capture device is controlled. For example, a microcontroller can control the capture device. The capture device can include an image capture device, a depth sensor, and a transceiver. In such embodiments, the microcontroller controls the image capture device, the depth sensors, and the transceiver. That is, the microcontroller instructs the image capture device to capture an image, the depth sensor to capture depth data, and the transceiver to transmit the image and the depth data. The flow continues at block 306.

At block 306, an image is captured. For example, the capture device can capture the image via the image capture device. The image is of a cut of meat. The image can be taken of the cut of meat by itself, with other cuts of meat, in a product packaging, etc. The flow continues at block 308.

At block 308, depth data is captured. For example, the depth sensor can capture the depth data. The depth data is associated with the cut of meat. In embodiments in which the depth sensor is incorporated with the image capture device (e.g., as a depth camera), the image capture device can capture the depth data. The flow continues at block 310.

At block 310, the image and the depth data are transferred. For example, the transceiver can transmit the image and the depth data to a control circuit. The image is of the cut of meat and the depth data is associated with the cut of meat. The flow continues at block 312.

At block 312, the image and depth data a received. For example, the control circuit can receive the image and depth data from the capture device. In one embodiment, the control circuit can be remote from the capture device and/or the database. For example, the control circuit can be cloud-based. The flow continues at block 314.

At block 314, a meat cut specification is retrieved. For example, the control circuit can retrieve the meat cut specification from the database. The control circuit retrieves a meat cut specification that is associated with the cut of meat. For example, if the cut of meat is a salmon steak, the control circuit can retrieve a meat cut specification associated with a salmon steak. In one embodiment, the capture device includes an indication of the cut of meat (e.g., the type of the cut of meat) with the image of the cut of meat and the depth data associated with the cut of meat. In such embodiments, the control circuit retrieves the meat cut specification based on the indication of the cut of meat. In other embodiments, the control circuit determines the cut of meat (e.g., the type of the cut of meat) based on the image of the cut of meat and/or the depth data associated with the cut of meat. In such embodiments, the control circuit retrieves the meat cut specification based on this determination. The flow continues at block 316.

At block 316, the cut of meat is evaluated. For example, the control circuit can evaluate the cut of meat. The control circuit evaluates the cut of meat based on the image of the cut of meat, the depth data associated with the cut of meat, and the meat cut specification associated with the cut of meat. For example, the control circuit can compare the image of the cut of meat and the depth data associated with the cut of meat to the meat cut specification associated with the cut of meat. The evaluation can consider the size of the cut of meat, the thickness of the cut of meat, proper trimming of the cut of meat, proper shape of the cut of meat, etc. The flow continues at block 318.

At block 318, the cut of meat is classified. For example, the control circuit can classify the cut of meat. The control circuit classifies the cut of meat based on the evaluation of the cut of meat. The classification of the cut of meat can include indicators associated with the size of the cut of meat, the thickness of the cut of meat, proper trimming of the cut of meat, proper shape of the cut of meat, etc., as well as markings indicating proper and/or improper cutting of the cut of meat.

In some embodiments, a system for ensuring quality of meat cuts comprises a capture device, the capture device comprising an image capture device, wherein the image capture device is configured to capture an image of a cut of meat, a depth sensor, wherein the depth sensor is configured to capture depth data associated with the cut of meat, a transceiver, wherein the transceiver is configured to transmit the image of the cut of meat and the depth data associated with the cut of meat to a control circuit, a microcontroller, wherein the microcontroller is configured to control the image capture device, the depth sensor, and the transceiver, a database, wherein the database is configured to store meat cut specifications, and the control circuit, wherein the control circuit is communicatively coupled to the capture device and the database, and wherein the control circuit is configured to receive, from the capture device, the image of the cut of meat and the depth data associated with the cut of meat, retrieve, from the database, a meat cut specification associated with the cut of meat, evaluate, based on the meat cut specification associated with the cut of meat, the image of the cut of meat and the depth data associated with the cut of meat, and classify, based on the evaluation of the cut of meat, the cut of meat.

In some embodiments, an apparatus and a corresponding method performed by the apparatus comprises storing, in a database, meat cut specifications, controlling, via a microcontroller, an image capture device, a depth sensors, and a transceiver, capturing, via the image capture device, an image of the cut of meat, capturing, via the depth sensor, depth data associated with the cut of meat, transmitting, via the transceiver to a control circuit, the image of the cut of meat and the depth data associated with the cut of meat, receiving, by the control circuit from the transceiver, the image of the cut of meat and the depth data associated with the cut of meat, retrieving, by the control circuit from the database, a meat cut specification associated with the cut of meat, evaluating, by the control circuit based on the meat cut specification associated with the cut of meat, the image of the cut of meat and the depth data associated with the cut of meat, and classifying, by the control circuit based on the evaluating the cut of meat, the cut of meat.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system ensuring quality for cuts of meat, the system comprising:
    a capture device, the capture device comprising:
        an image capture device, wherein the image capture device is configured to capture an image of a cut of meat;
        a depth sensor, wherein the depth sensor is configured to capture depth data associated with the cut of meat;
        a transceiver, wherein the transceiver is configured to transmit the image of the cut of meat and the depth data associated with the cut of meat to a control circuit; and
        a microcontroller, wherein the microcontroller is configured to control the image capture device, the depth sensor, and the transceiver;
    a database, wherein the database is configured to store meat cut specifications; and
    wherein the control circuit, the database, and the image capture device are each remotely located from each other, wherein the control circuit is communicatively coupled to the capture device and the database, and wherein the control circuit is configured to during an execution phase subsequent to a training phase:
        receive, from the capture device, the image of the cut of meat and the depth data associated with the cut of meat;
        retrieve, from the database, a meat cut specification associated with the cut of meat, the meat cut specification being retrieved based upon analysis of the image to determine the cut of meat and also being retrieved based upon the depth data;
        evaluate the cut of meat based on the meat cut specification associated with the cut of meat, and the image of the cut of meat and the depth data associated with the cut of meat; and
        classify the cut of meat based on the evaluation of the cut of meat;
    wherein the meat cut specification is created by the control circuit in a neural network model during the training phase, wherein during the training phase the control circuit receives training images including markings, wherein the training images with the markings are presented on a screen of a mobile device with a plurality of classification indicators, each of the plurality of classification indicators indicating a meat classification, wherein the markings in the training images are provided onto the image by a user utilizing the mobile device, and wherein the user designates each of the areas in each of the images indicated by the markings as being properly or improperly cut by selecting a classification indicator on the screen to associate with the designated area, wherein during the training phase the control circuit generates, using the neural network model, the meat cut specification based upon an analysis of the areas in the training images bounded by the markings and the designations of the user.

2. The system of claim 1, wherein:
    the control circuit is further configured to:
        cause transmission, to the mobile device, of an indication of a classification of the cut of meat; and
    wherein the mobile device is configured to:
        receive the indication of the classification of the cut of meat; and
        present, via a display device of the mobile device, information associated with the cut of meat, wherein the information associated with the cut of meat includes the classification of the cut of meat.

3. The system of claim 1, wherein the meat cut specifications are prepopulated.

4. The system of claim 1, wherein the control circuit classifies the cut of meat based on one or more of undertrimming, overtrimming, thickness, hacked tail, square cow, misalignment, shape, and fat content.

5. The system of claim 1, wherein one or more of the image capture device, depth sensor, transceiver, and microcontroller are resident on a single device.

6. The system of claim 1, wherein the image capture device and depth sensor are incorporated in a single device, and wherein the single device is a depth camera.

7. The system of claim 1, wherein each of the image capture device, depth sensor, and microcontroller are separate hardware components that are communicatively coupled.

8. A method for ensuring quality for cuts of meat, the method comprising:
    storing, in a database, meat cut specifications during a training phase;
    during an execution phase subsequent to the training phase:
    controlling, via a microcontroller, an image capture device, a depth sensor, and a transceiver;
    capturing, via the image capture device, an image of a meat cut;
    capturing, via the depth sensor, depth data associated with the cut of meat;
    transmitting, via the transceiver to a control circuit, the image of the cut of meat and the depth data associated with the cut of meat; wherein the control circuit, the database, and the image capture device are each remotely located from each other;
    receiving, by the control circuit from the transceiver, the image of the cut of meat and the depth data associated with the cut of meat;
    retrieving, by the control circuit from the database, a meat specification associated with the cut of meat, the meat cut specification being retrieved based upon analysis of the image to determine the cut of meat and also being retrieved based upon the depth data;
    evaluating, by the control circuit the cut of meat based on the meat cut specification associated with the cut of meat, the image of the cut of meat and the depth data associated with the cut of meat; and
    classifying, by the control circuit the cut of meat based on the evaluating the cut of meat;
        wherein the meat cut specification is created by the control circuit in a neural network model during the training phase, wherein during the training phase the control circuit receives training images including markings, wherein the training images with the markings are presented on a screen of a mobile device with a plurality of classification indicators, each of the plurality of classification indicators indicating a meat classification, wherein the markings in the training images are provided onto the image by a user utilizing the mobile device, and wherein the user designates each of the areas in each of the images indicated by the markings as being properly or improperly cut by selecting a classification indicator on the screen to associate with the designated area, wherein during the training phase the control circuit generates, using the neural network model, the meat cut specification based upon an analysis of the areas in the training images bounded by the markings and the designations of the user.

9. The method of claim 8, further comprising:

causing transmission, by the control circuit to the mobile device, of an indication of a classification of the cut of meat;

receiving, by the mobile device, the indication of the classification of the cut of meat; and presenting, by the mobile device via a display device, information associated with the cut of meat, wherein the information associated with the cut of meat includes the classification of the cut of meat.

10. The method of claim 8, wherein the meat cut specifications are prepopulated.

11. The method of claim 8, wherein the control circuit classifies the cut of meat based on one or more of undertrimming, overtrimming, thickness, hacked tail, square cow, misalignment, shape, and fat content.

12. The method of claim 8, wherein a mobile device incorporates one or more of the image capture device, the depth sensor, the transceiver, and the microcontroller in a single device.

13. The method of claim 8, wherein the image capture device and depth sensor are incorporated in a single device, and wherein the single device is a depth camera.

14. The method of claim 8, wherein each of the image capture device, depth sensor, and microcontroller are separate hardware components that are communicatively coupled.

* * * * *